United States Patent [19]

Hörler

[11] Patent Number: 4,547,083
[45] Date of Patent: Oct. 15, 1985

[54] BEARING DEVICE FOR AN EXHAUST GAS TURBO-CHARGER WITH TANDEM ROLLING-CONTACT BEARINGS

[75] Inventor: Hansulrich Hörler, Zurich, Switzerland

[73] Assignee: BBC Brown, Boveri & Company Limited, Baden, Switzerland

[21] Appl. No.: 670,576

[22] Filed: Nov. 13, 1984

[30] Foreign Application Priority Data

Nov. 30, 1983 [CH] Switzerland ............... 6401/83

[51] Int. Cl.⁴ .................................. F16C 27/04
[52] U.S. Cl. ..................................... 384/535; 384/581
[58] Field of Search ............... 384/535, 450, 504, 517, 384/581, 611, 613; 308/DIG. 15, 184

[56] References Cited

U.S. PATENT DOCUMENTS 2,255,717  9/1941  Tyler ........................... 384/535 X
3,473,853  10/1969 Goss et al. .................... 384/535
3,965,699  6/1976  Bracken, Jr. ................. 384/535 X

FOREIGN PATENT DOCUMENTS 1285254  12/1968  Fed. Rep. of Germany ...... 384/581
  15951   2/1977  Japan .......................... 384/535
 931581   7/1963  United Kingdom ............. 384/581
1162900   8/1969  United Kingdom ............. 384/494

Primary Examiner—Stuart S. Levy
Assistant Examiner—Thomas R. Hannon
Attorney, Agent, or Firm—Oblon, Fisher, Spivak, McClelland & Maier

[57] ABSTRACT

In a bearing device of an exhaust gas turbocharger having tandem rolling-contact bearings, the bearing support rings (5,6) have dogs (16) on their mutually facing end surfaces, each of which dogs penetrates into an opposite recess (17) with axial clearance (18) and tangential clearance (19). An even number of rotationally symmetrically located spring rods (7) extend from a bearing flange (8) connected to the bearing housing (2) through the bearing support rings (5,6) and into a support ring (9) connected to the bearing housing (2), a centrally located collar (14) on the spring rods being located alternately, without clearance, in one or the other bearing support ring (5,6).

In this bearing device, the effective bending length (L) of the spring rod (7) is relatively large compared to the total width of the bearing (B). By this means, the bending stress in the spring rods (7) can be kept low or the axial installation length (B) of the bearing device can be reduced.

10 Claims, 2 Drawing Figures

BEARING DEVICE FOR AN EXHAUST GAS TURBO-CHARGER WITH TANDEM ROLLING-CONTACT BEARINGS

FIELD OF THE INVENTION

The invention concerns a bearing in which each rolling-contact bearing outer race is fixed in its own bearing support ring and the bearing support rings are penetrated by a multiplicity of rotationally symmetrically located spring rods which extend parallel to the axis of the turbo-charger.

In exhaust gas turbo-chargers, large axial forces act on the rotor. In the case of large exhaust gas turbo-chargers, these axial forces are carried by two rolling-contact bearings located in series. In order to limit the radial forces on the bearing, even in the case of large out-of-balance, the rolling-contact bearings must have sprung and damped support in the housing. The problem consists in the fact that the two rolling-contact bearings must be supported individually and independently of one another so that the radial force is fairly evenly distributed between the two rolling-contact bearings even if the turbo-charge shaft is skewed relative to the casing. The reason for this skewed position can be either swash or eccentricity of the housing parts or bending of the shaft. The outer races of the rolling-contact bearings are then displaced relative to one another in the radial direction and this movement must not be prevented.

Furthermore, the axial installation length of the bearing device in an exhaust gas turbo-charger should be kept as small as possible for design reasons.

In many turbo-machines, such as aircraft engines, for example, bearing devices are used in which the bearings are supported radially by means of a rotationally symmetrical arrangement of axial spring rods. If these bearing devices have tandem rolling-contact bearings, each rolling-contact bearing outer race is located in its own bearing support ring. The latter is provided with acceptance features for the spring rods, which extend parallel to the axis of the turbo-charger. The rod ends remote from the bearing are fixed in parts rigidly connected to the bearing housing and the ends near the bearing are pressed into the corresponding bearing support ring with a snap fit. Although bearing devices of this type are functionally effective, the axial installation length required to ensure a sufficient bending length, and hence sufficiently low bending stresses in the spring rods, is relatively large.

OBJECTIVE OF THE INVENTION

The objective of the invention is, therefore, to produce a bearing device for exhaust gas turbo-chargers with tandem rolling-contact bearings such that the bending length of the spring rods is as large as possible for a given axial installation length.

ADVANTAGES OF THE INVENTION

The essential advantages achieved by the invention are seen as being a more favourable utilisation of the axial installation length available for the location of a bearing device with tandem rolling-contact bearings and in the fact that the effective bending length of the spring rods is relatively large for a given installation length. In consequence, the bending stresses in the spring rods become smaller if the other factors of influence remain the same.

BRIEF DESCRIPTION OF THE DRAWINGS

An embodiment example of the subject matter of the invention is shown simplified in the drawings.

In this.

The same parts are provided with the same reference signs in both figures.

DETAILED DESCRIPTION OF THE PRESENTLY PREFERRED EMBODIMENT

Figure 1:
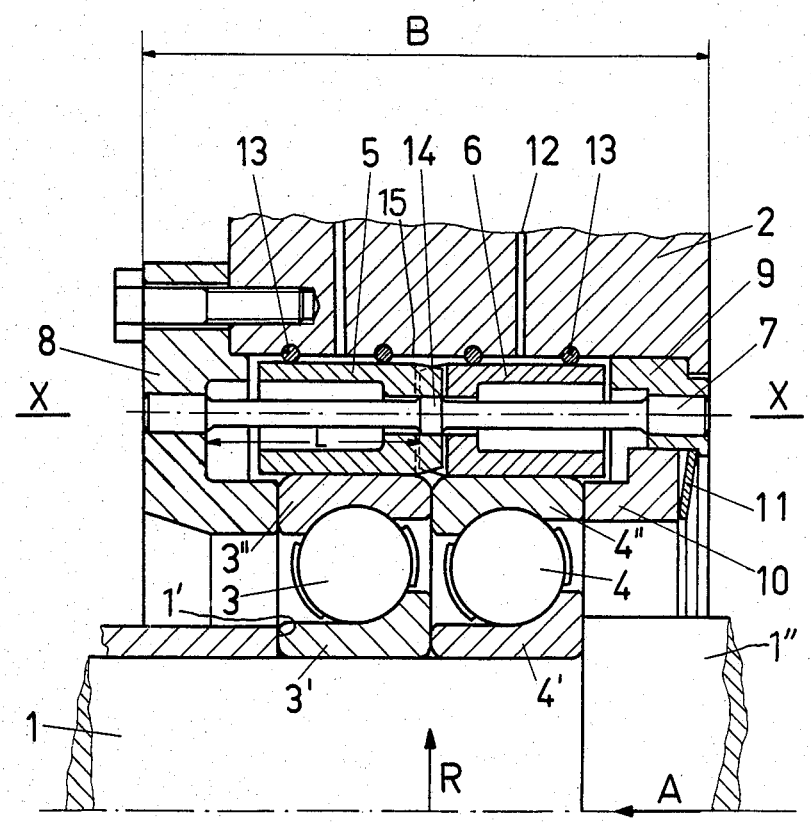
FIG. 1 shows partially, in longitudinal section, a bearing device of an exhaust gas turbo-charger with tandem rolling-contact bearings.
Figure 2:
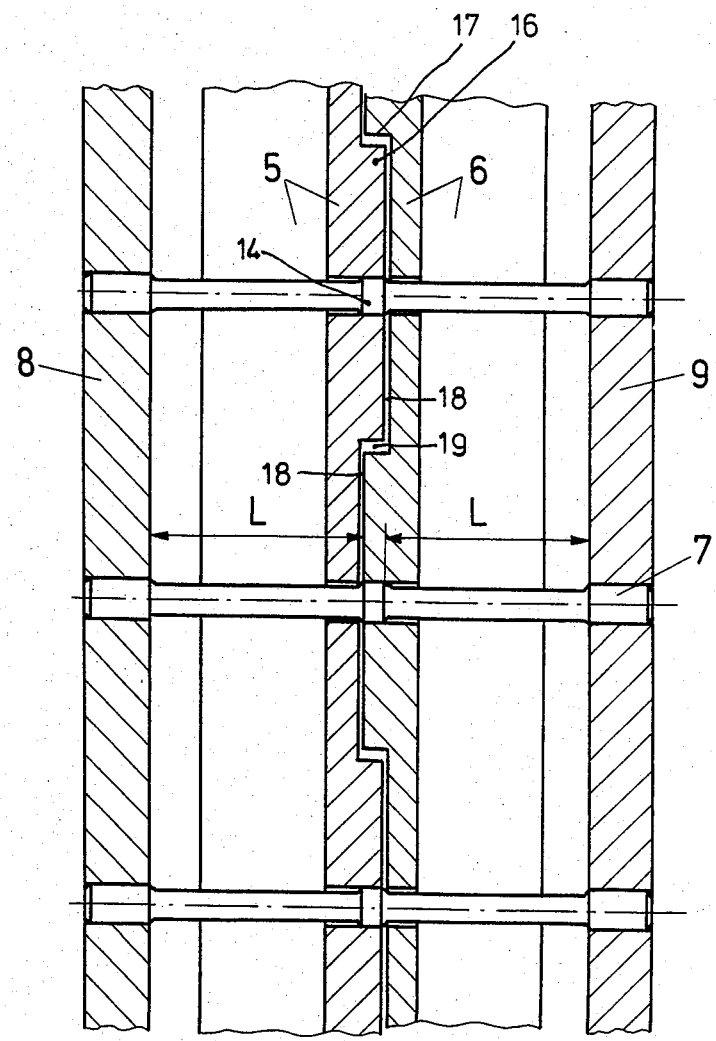
FIG. 2 shows a developed peripheral section along the line X—X in FIG. 1.

FIG. 1 shows the upper half of a bearing device in which rolling-contact bearing inner races 3' and 4' are pressed onto a turbo-charger shaft 1 and are held between a stop 1' and a distance piece 1". The rolling-contact bearing outer races 3" and 4" are retained, in the axial direction, between a bearing flange 8 and a damping ring 10. The bearing flange 8 is solidly screwed onto the bearing housing 2. Bearing support rings 5 and 6 are pressed without clearance onto the outer races 3" and 4" of the rolling-contact bearings 3 and 4. The bearing support rings 5,6 are penetrated by an even number of spring rods 7 in a rotationally symmetrical arrangement. The spring rods 7 extend parallel to the axis of the turbo-charger. Their ends remote from the bearings are pressed into the bearing flange 8 on one side and into a support ring 9 on the other. This support ring is only provided to facilitate assembly. It could be replaced by pressing the spring rods directly into holes in the correspondingly adapted housing.

There is a radial gap 15 between the bearing support rings 5,6 and the bearing housing 2. An oil supply duct 12 is located in the bearing housing 2 approximately in the centre of the axial length of each bearing support ring 5,6. Oil sealing rings 13 are located in the annular grooves, which are present in the bearing housing 2 to the sides of the oil supply ducts 12, in such a way that an oil filled annular space connected to the oil supply duct 12 is produced, in each case, between a bearing support ring 5 (or 6), the bearing housing 2 and two oil sealing rings 13 for each annular space. This oil squeeze device provides a damping system whose damping characteristic depends, inter alia, on the flow resistance in the oil supply ducts 12.

In addition to this first damping system, a second frictional damping device is provided. This consists of the damping ring 10 amd a plate spring 11, the damping ring 10 being located with prestress between the external end surface of the rolling-contact bearing outer race 4" and the plate spring 11. By means of this plate spring, frictional damping of the radial vibrations is attained because frictional work must be performed during radial movements of the rolling-contact bearing outer races 3" and 4" relative to the bearing housing 2 and this frictional work substantially affects the damping characteristics of the sprung system.

In operation, the rolling-contact bearings 3 and 4 located in tandem arrangement are subjected to an axial force A and a radial force R. The two forces A and R on the rolling-contact bearings 3 and 4 are fairly evenly distributed and transmitted to the bearing housing 2. In this process, the axial force A is directly accepted by the bearing flange 8 while the radial force R is transmitted via the spring rods 7 into the bearing flange 8 and the support ring solidly connected to the bearing housing 2.

So that they can carry the radial forces acting on the rolling-contact bearings, the spring rods 7 penetrating the bearing support rings 5,6 must be connected to the rings in a suitable manner in order to provide a force path. For this purpose, the bearing support rings 5 and 6 are provided with dogs 16 on their mutually facing end surfaces, each dog engaging without contact, i.e. with axial clearance 18 and tangential clearance 19, in the opposite recess 17 of the other ring. The number of dogs or recesses corresponds to the number of spring rods and an even number should be selected in the present case so that each bearing has the same number of rods available. The distribution is made in such a way that every other spring rod, in the peripheral direction, carries the radial forces from the same bearing 3 or 4.

The retention position of the spring rods is so selected that the effective bending length L is the same on both sides. The spring rods 7 are held by means of a collar 14, which is located at half the rod length and fits with a snap fit in a corresponding hole in the dog type part of the rings. The collar 14 can be kept relatively narrow in its axial extension because no moments have to be transmitted by the spring rods at this position. Because of this configuration, it is obvious that the spring rod must not make contact when passing through the ring with the recess. Since, in the case of equal bending lengths on both sides, all the retention points are located in the same radial plane, the height necessary for the dogs and depth necessary for the recesses is also fixed for a given axial extent of the collar 14.

Calculations have shown that, compared with the solution associated with the present state of technology (in which each bearing race is connected by its own spring rods to its end of the housing), the larger bending length L in the new solution permits, for the same number of spring rods, either a reduction of ⅓ in the bending stress or—for the same bending stress—a reduction of 1/6 in the total width B of the bearing installation.

In the case of larger rotor out-of-balance, the radial stop is limited by the radial clearance 15 present between the bearing support rings 5,6 and the bearing housing 2 so that the spring rods 7 cannot be overloaded. In the case of a skew position of the turbo-charger shaft 1 relative to the bearing housing 2, the radial loading on the two rolling-contact bearings 3 and 4 becomes asymmetrical, i.e. the radial force to be transmitted by one rolling-contact bearing is increased by an amount proportional to the local bending of the spring rod 7.

I claim:

1. Bearing device on an exhaust gas turbo-charger with tandem rolling-contact bearings in which each rolling-contact bearing outer race is fixed in its own bearing support ring and the bearing support rings are penetrated by a multiplicity of rotationally symmetrically located spring rods which extend parallel to the axis of the turbo-charger, the ends of the spring rods remote from the bearing being rigidly fixed relative to the bearing housing wherein:
    (a) the bearing support rings have dogs on their mutually facing end surfaces, which dogs each penetrate with axial clearance and tangential clearance into recesses lying opposite, and
    (b) the spring rods are retained in the dogs by means of a retention collar.

2. Bearing device in accordance with claim 1, wherein the retention collars are located at half the length of the spring rods.

3. Bearing device in accordance with claim 1, wherein the spring rods are retained by means of a snap fit.

4. Bearing device in accordance with claim 1, wherein the dogs and the recesses in the bearing support rings follow one another in the peripheral direction.

5. Bearing device in accordance with claim 1, wherein the number of spring rods is even.

6. An exhaust gas turbo-charger comprising:
    (a) a turbo-charger shaft rotatable about a central axis;
    (b) a bearing housing surrounding said turbo-charger shaft;
    (c) tandem rolling-contact bearings mounted on said turbo-charger shaft;
    (d) A bearing support ring disposed between each of said rolling-contact bearings and said bearing housing, said bearing support rings having mutually facing end surfaces on each of which are located a plurality of axially extending dogs and, circumferentially spaced therebetween, a plurality of axially extending recesses which accept the axially ending dogs on the other one of said bearing support rings which axial and tangential clearances; and
    (e) a plurality of rotationally symmetrically located spring rods which extend through said bearing supports in parallel to the axis of said turbo-changer shaft, the ends of said spring rods extending axially outwardly of said bearing support rings being rigidly fixed relative to said bearing housing, each of said spring rods passing through one of the dogs and the corresponding recess on said bearing support rings and being retained in the dog by means of a collar.

7. An exhaust gas turbo-charger as recited in claim 6 wherein the collars on said spring rods are located at the axzial center of said spring rods.

8. An exhaust gas turbo-charger as recited in claim 6 wherein said spring rods are retained in said dogs by means of a snap fit.

9. An exhaust gas turbo-charger as recited in claim 6 wherein one end of each of said spring rods is received in a bearing flange screwed onto said bearing housing and the other end of each of said spring rods is received in a support ring disposed between said bearing housing and said turbo-charger shaft.

10. An exhaust gas turbo-charger as recited in claim 6 wherein the number of said spring rods is even.

* * * * *